UNITED STATES PATENT OFFICE.

GEORGES IMBERT, OF NUREMBERG, GERMANY.

PROCESS OF PRODUCING GLYCIN DERIVATIVES.

No. 894,149.  Specification of Letters Patent.  Patented July 21, 1908.

Application filed June 22, 1907. Serial No. 380,346.

*To all whom it may concern:*

Be it known that I, GEORGES IMBERT, a subject of the German Emperor, residing at 54 Gugelstrasse, Nuremberg, Bavaria, Germany, have invented a new and useful Improved Process for Producing Glycin Derivatives, of which the following is a full, clear, and exact description.

The present invention consists of an improved process for producing aromatic glycin derivatives.

Aromatic glycins have hitherto been produced by condensing aromatic amins with monohalogen-acetic-acid derivatives. My experiments have shown, however, that dihalogen-ethoxy-ethylenes may be advantageously substituted for the latter derivatives, the dihalogen-ethoxy-ethylenes having been shown by me elsewhere, to be easily accessible bodies.

The generation of the aromatic glycin-derivatives from dihalogen-ethoxy-ethylenes may be explained by assuming that the latter are converted by intermediary reaction into monohalogen acetic ether or ester, thus:

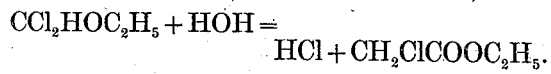

$$CCl_2HOC_2H_5 + HOH = HCl + CH_2ClCOOC_2H_5.$$

The reaction is carried out advantageously by heating 1 gram molecule of dihalogen-ethoxy-ethylene with about 3 gr.-mol. of aromatic amin in water or a diluted alcoholic solution. A mixture of glycin-ester and glycin-anilid, (or toluid etc.) the mutual proportions of which will be dependent on the working conditions, will thus be attained.

Example I: 140 kg. of dichlor-ethoxy-ethylene (about 1 gr. mol.), 300 kg. of anilin (ca 3 gr.-mol.) and 100 liters of water are boiled in circulation for a period of 24 hours. At the conclusion of the reaction the unchanged parts are driven off by means of steam: the residue will contain a mixture of about 90% of phenyl-glycin-ester and about 10% of phenyl-glycin-anilid, which may be separated from each other by the known methods.

Example II: 230 kg. of dibrom-ethoxy-ethylene (about 1 gr.-mol.) 300 kg. of anilin (about 3 gr.-mol.) and 300 liters of about 85% alcohol are heated to about 150° C. in an autoclave for a period of about 12 hours and the process completed in the manner described with reference to Example I.

It was also found that the quantity of the aromatic amin in circulation can be reduced by reconverting the chlorid salt generated to free amin, by the addition from time to time of an acid-binding medium. Care should however be taken that no surplus of the acid-binding substances is present.

Example III: 140 kg. of dichlor-ethoxy-ethylene (about 1 gram-mol.) 100 kg. of anilin (about 1 gram-mol.), 100 liters of water and 5 kg. of concentrated hydrochloric acid are boiled in circulation until the result of the reaction will turn congo-paper blue. Carbonate of calcium is now gradually added in such quantities as not to convert more than $\frac{9}{10}$ of the hydrate of chlorin, present at any time, into anilin: the boiling is then continued. The developments can be accurately followed by titration. The reaction will be complete in about 24 hours.

I claim as my invention:—

1. A process for generating the aromatic glycin-derivatives, which consists in heating dihalogenethoxyethylenes with a surplus of aromatic amins.

2. A process for generating the aromatic glycin-derivatives, which consists in heating dihalogenethoxyethylenes with aromatic amins in the proportion of 1:1 gr. mol. and adding acid binding substances during the reaction.

In testimony whereof I affix my signature in the presence of two witnesses.

GEORGES IMBERT.

Witnesses:
 EUGEN GALITZENSTEIN,
 JOHANN TANMUNSTHOD.